United States Patent
Deckmyn et al.

(10) Patent No.: US 11,745,724 B2
(45) Date of Patent: Sep. 5, 2023

(54) DIAGNOSTIC AND CONTROL METHOD FOR A VEHICLE SYSTEM

(71) Applicant: Dana Belgium N.V., Bruges (BE)

(72) Inventors: Peter Deckmyn, Koekelare (BE); Bjorn Aelvoet, Lievegem (BE); Brecht Fevery, Bruges (BE)

(73) Assignee: Dana Belgium N.V., Bruges (BE)

( * ) Notice: Subject to any disclaimer, the term of this patent is extended or adjusted under 35 U.S.C. 154(b) by 162 days.

(21) Appl. No.: 17/320,105

(22) Filed: May 13, 2021

(65) Prior Publication Data

US 2022/0363241 A1 Nov. 17, 2022

(51) Int. Cl.
*B60W 20/30* (2016.01)
*B60W 10/06* (2006.01)
*B60W 10/08* (2006.01)
*B60W 10/11* (2012.01)

(52) U.S. Cl.
CPC ............ *B60W 20/30* (2013.01); *B60W 10/06* (2013.01); *B60W 10/08* (2013.01); *B60W 10/11* (2013.01); *B60W 2510/083* (2013.01); *B60W 2510/1005* (2013.01); *B60W 2710/248* (2013.01); *B60W 2720/30* (2013.01)

(58) Field of Classification Search
CPC ...... B60W 20/30; B60W 10/06; B60W 10/08; B60W 10/11; B60W 2510/083; B60W 2510/1005; B60W 2710/248; B60W 2720/30
USPC ......................................................... 701/22
See application file for complete search history.

(56) References Cited

U.S. PATENT DOCUMENTS

| | | | |
|---|---|---|---|
| 4,495,457 A | 1/1985 | Stahl | |
| 6,357,289 B1* | 3/2002 | Futawatari | F16H 61/12 73/114.36 |
| 7,794,349 B2 | 9/2010 | Gierer et al. | |
| 7,857,728 B2 | 12/2010 | Tasaka et al. | |
| 7,970,524 B2 | 6/2011 | Gruenter | |
| 7,980,981 B2 | 7/2011 | Kawaguchi et al. | |
| 8,548,712 B2 | 10/2013 | Oesterreicher et al. | |
| 9,235,727 B2 | 1/2016 | Thomas et al. | |
| 9,738,288 B2 | 8/2017 | Inoue et al. | |
| 10,127,161 B2 | 11/2018 | Wegner et al. | |
| 10,696,289 B2 | 6/2020 | Shelton et al. | |
| 2014/0121871 A1* | 5/2014 | Kim | B60W 10/06 180/65.265 |
| 2017/0166203 A1* | 6/2017 | Sugai | B60W 10/184 |
| 2018/0072306 A1 | 3/2018 | Yamazaki et al. | |
| 2018/0258251 A1 | 9/2018 | Toledo Antonio et al. | |
| 2019/0235448 A1 | 8/2019 | Banginwar et al. | |

(Continued)

FOREIGN PATENT DOCUMENTS

DE 102007031769 A1 1/2009
EP 2952784 A1 12/2015

*Primary Examiner* — Yi-Kai Wang
(74) *Attorney, Agent, or Firm* — McCoy Russell LLP

(57) ABSTRACT

Methods and systems are provided for controlling and diagnosing a mechanical vehicle component. In one example, a method may include determining an input device state and an electric machine torque at a diagnostic controller, and identifying a fault condition based on these determinations. Further, the diagnostic controller may trigger an active fault state of the mechanical vehicle component to avoid unintended vehicle acceleration, particularly at low speeds.

19 Claims, 6 Drawing Sheets

(56) References Cited

U.S. PATENT DOCUMENTS

| | | | |
|---|---|---|---|
| 2021/0101584 A1* | 4/2021 | Cho | B60W 40/10 |
| 2022/0227354 A1* | 7/2022 | Hagiwara | B60T 8/1755 |

* cited by examiner

DIAGNOSTIC AND CONTROL METHOD FOR A VEHICLE SYSTEM

TECHNICAL FIELD

The present description relates generally to control and diagnostic strategies in a vehicle system. More particularly, the present description relates to techniques for fault monitoring in a driveline system.

BACKGROUND AND SUMMARY

Different sets of vehicle driveline conditions may lead to unintended behaviors. The unintended behaviors may include unwanted changes in vehicle acceleration and other undesirable kinematic behavior. For instance, a number of conditions can cause erroneous clutch settings that may lead to unwanted vehicle braking or movement in an unintended direction. In an attempt to avoid these unwanted behaviors, previous vehicle control and diagnostic systems have guarded against unintended behaviors by verifying actual settings against requested settings. When the mismatch in the settings is too large, actions are taken to discontinue or altogether avoid the unintended behaviors.

U.S. Pat. No. 7,980,981 B2 to Kawaguchi et al. discloses a vehicle system including an automatic transmission that includes a plurality of clutches and brakes to change the gear ratio of the transmission. The system determines whether or not at least one or more of the clutches is brought into unintended engagement. Said determination is carried out by analyzing vehicle deceleration and an intended gear ratio and an actual gear ratio.

U.S. Pat. No. 8,548,712 B2 to Oesterreicher et al. discloses a vehicle system and method for fault monitoring of drive operations, particularly for preventing vehicle acceleration if a set-point drive torque deviates significantly from an accelerator pedal input. The method includes comparing a calculated vehicle acceleration against the expected vehicle acceleration.

The inventors have recognized several drawbacks with the systems and methods disclosed by Kawaguchi and Oesterreicher, as well as other diagnostic systems. For instance, fault detection strategies which rely on comparison of actual vs. intended gear ratio are processing intensive strategies that may lead to the incorrect identification of a fault, in certain situations. This superfluous fault detection may restrict vehicle performance and lead to unnecessary servicing of the vehicle, in some cases. Further, Kawaguchi's diagnostic logic is provided in a single engine control unit responsible for component control operations and fault detection in the vehicle system. This may involve complex processing strategies that are not always effective or reliable, due to the fault misdiagnoses, described above. Additionally, using a single controller for both diagnostic and control operations may prove to be inflexible and inefficient with regard to altering or updating routines of either operation. Further, other prior fault detection strategies have involved complex systems that use a comparatively large number of inputs and guard against a large number of unwanted settings such as software faults, hydraulic faults, etc. As such, previous diagnostic strategies may demand a large amount of processing resources to implement, and therefore may decrease the system's processing efficiency. Therefore, the inventors have recognized a need for a more effective and efficient diagnostic system for fault detection.

To overcome at least a portion of the aforementioned drawbacks, a method for operation of a vehicle system is provided. In one example, the method includes, at a diagnostic controller or processing unit independent from a driveline controller or processing unit, determining an input device state and an electric machine torque. The method further includes determining a fault condition of a vehicle component based on the input device state and the electric machine torque. The method even further includes, in response to determining the fault condition, triggering a fault state of the vehicle component and controlling the vehicle component in a fault mode. Further, triggering the fault state of a vehicle component via the diagnostic control may override nominal control commands from the driveline controller. In this way, a simple and reliable system is provided for efficiently executing diagnostic routines with higher accuracy and operating the vehicle to avoid unwanted changes in kinematic performance.

In one example, a method is provided to identify a condition where excessive drive torque is anticipated to be applied to the vehicle wheels in the case of no or low throttle demand, which may result in unintended longitudinal vehicle acceleration. The diagnostic controller monitors at least a torque applied by an electric machine (e.g., motor-generator) and a vehicle speed to determine a fault condition where the applied torque exceeds a threshold value. Further, the diagnostic controller may inhibit the determination of a fault condition when the vehicle speed exceeds a threshold value, since at higher speeds, the torque exceeding the threshold torque may lead to a proportionally small amount of vehicle acceleration. In other words, at higher vehicle speeds, a vehicle operator may not perceive a smaller but unintended increase in vehicle speed due to the unintended clutch and/or electric machine settings, for example, and triggering a fault under these conditions may therefore be foregone. In this way, the system reliably reduces the chance of unintended vehicle acceleration at comparatively lower speeds while avoiding unwarranted triggering of a fault at higher speeds.

In some examples, the vehicle component may be an inverter coupled to the electric machine, and the fault state or mode may be realized by decreasing a flow of power from a multi-phase inverter to the electric machine. In other examples, the vehicle component may be a gearbox that includes one or more clutches, and operating the gearbox in a fault state includes removing the closing force from the clutches to bring them into an opened state. As such, the system may trigger a fault state in the mechanical component to inhibit power transfer to the wheels, thus avoiding unwanted vehicle acceleration. Consequently, the operator's perception of vehicle handling performance may be enhanced by avoiding unanticipated vehicle motion.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a driveline component control strategies and fault diagnostics in a vehicle system. The system uses efficient logic for confident and independent fault diagnosis to reduce the likelihood of undesired driveline and more generally vehicle behaviors. The system uses independent controllers, or processing units, to implement nominal driveline control strategies and diagnostic (e.g., fault detection) strategies. As such, diagnostic routines may be executed independently from nominal control strategies and is not influenced by the nominal control strategies. Thus, a diagnostic controller determines a fault condition of a driveline component and triggers a fault state to operate the driveline component in a fault mode, overriding the nominal control settings of a driveline controller. The separation of control and diagnostic logic allows for independent alteration of control and fault applications, providing increased system adaptability and diagnostic reliability. This adaptability may result in efficient integration of fault diagnostics into an existing control architecture, as well as the ability to independently update or otherwise alter diagnostic and/or control architecture in a wide variety of driveline platforms.

To achieve the diagnostic efficiency gains, the diagnostic routine compares actual component settings to thresholds that are anticipated to cause unwanted kinematic vehicle behavior (e.g., unintended acceleration/deceleration or vehicle movement in an unintended direction). The thresholds may be stored in a lookup truth table and correspond to values which have a high likelihood of causing the unwanted kinematic behavior. This comparison may disregard intended settings to achieve greater accuracy in the fault diagnosis, using lower computational intensive calculations than previous strategies. The diagnostic system may further determine if a fault duration exceeds a fault tolerance time that may be correlated to the component's reaction time. By using the fault duration in this manner, the diagnostic accuracy may be further increased. Mapping the diagnostic thresholds to values that have a greater chance of causing unwanted vehicle movement to trigger a fault, as opposed to triggering a fault whenever component settings deviate from intended values, drives down the likelihood of incorrect fault generation. Situations where the vehicle is superfluously placed in the fault state, which may impact vehicle performance, may be avoided.

Figure 1:
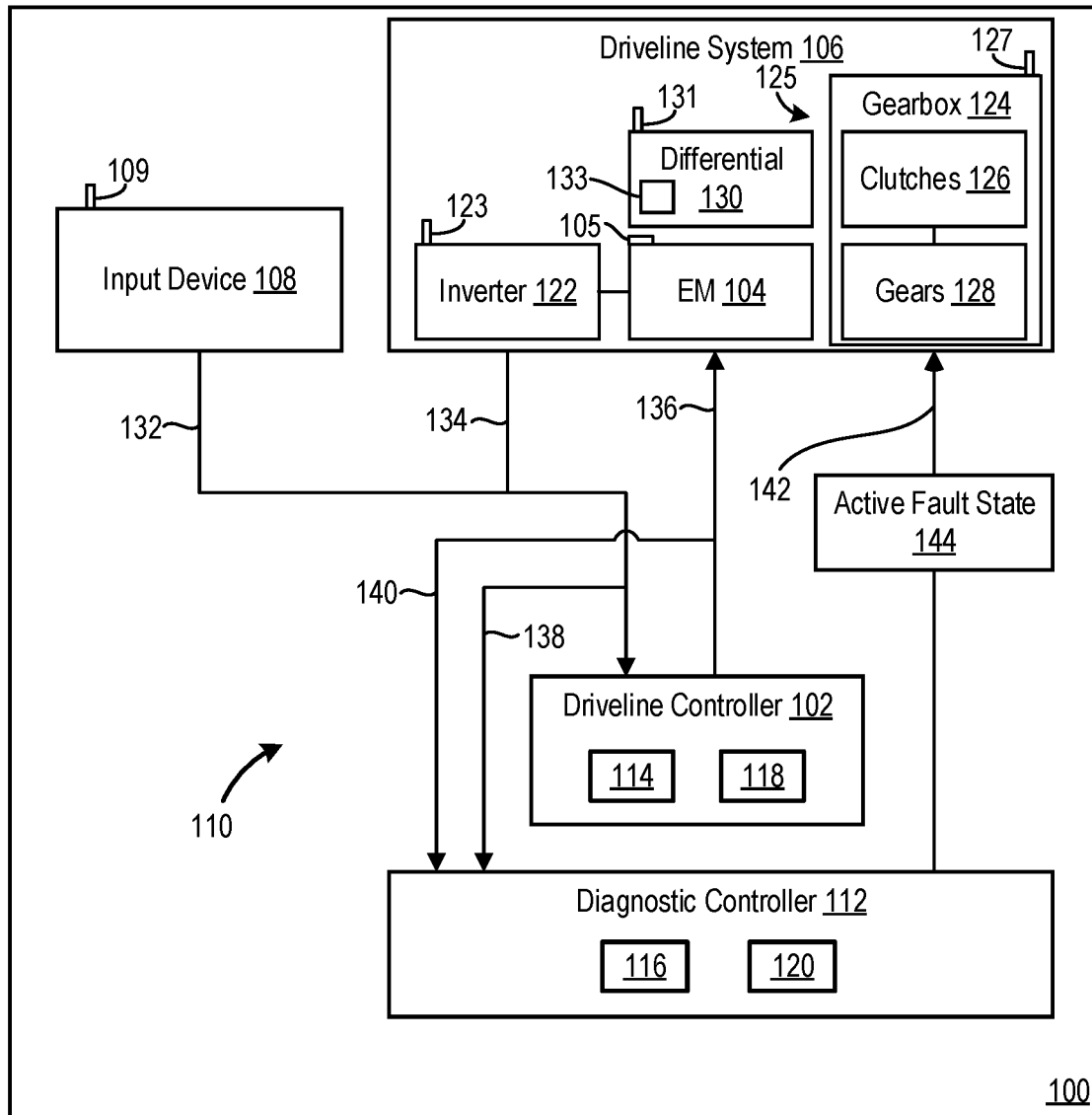
FIG. 1 is a schematic depiction of a vehicle system with a controller.
Figure 2:
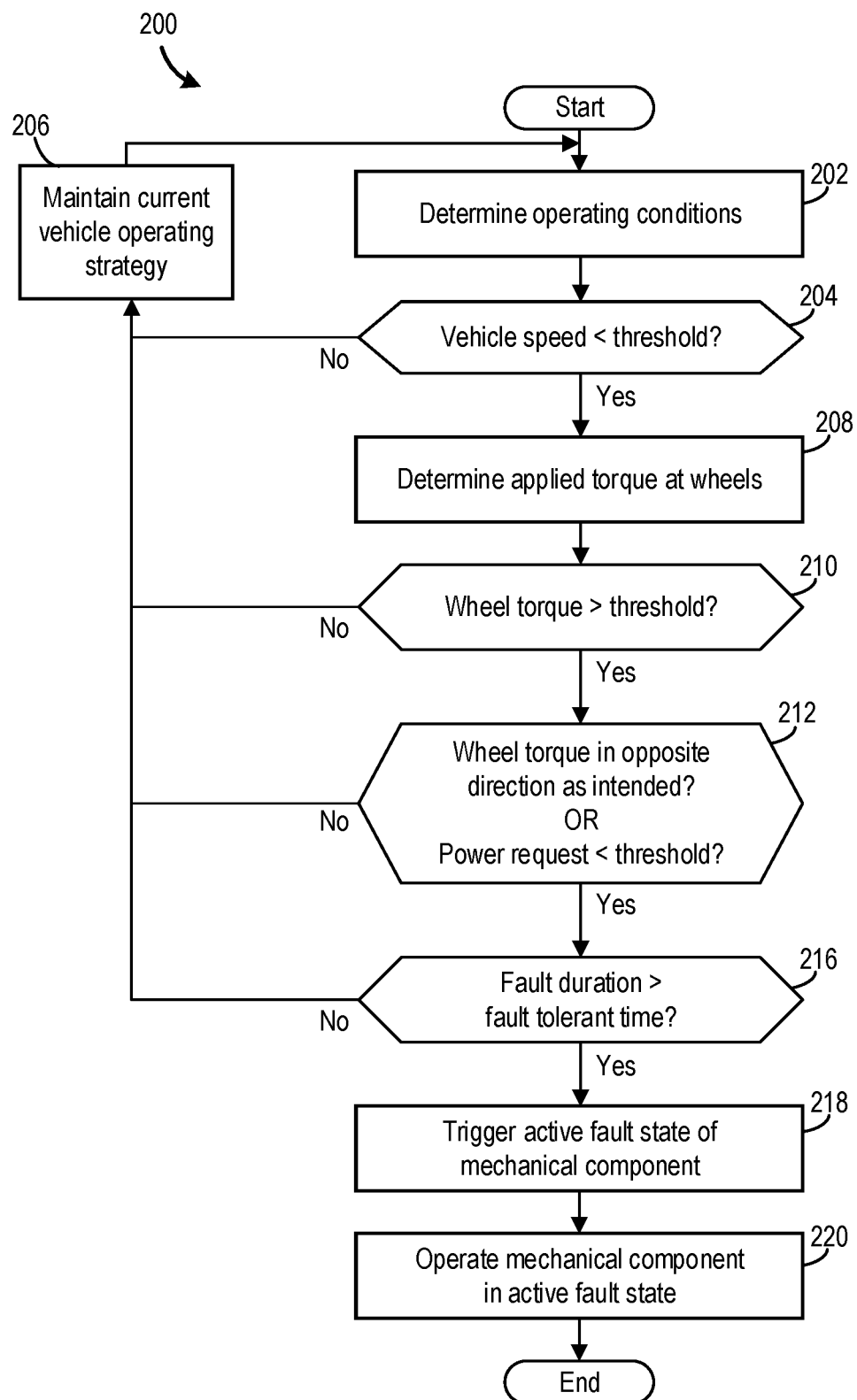
FIG. 2 is a flow chart depicting an example control and diagnostic process of a vehicle system.
Figure 3:
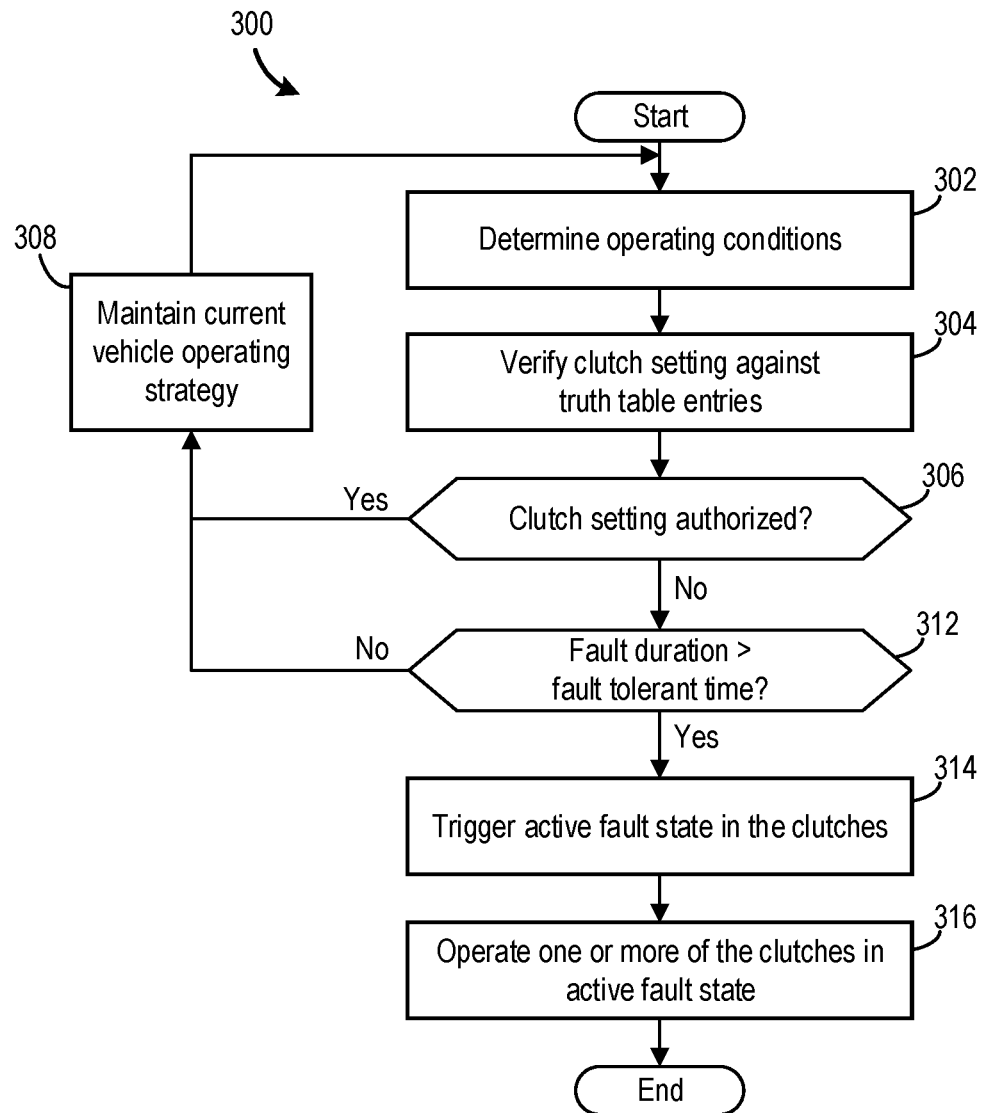
FIG. 3 is a flow chart depicting another example control and diagnostic process of a vehicle system.
Figure 4:
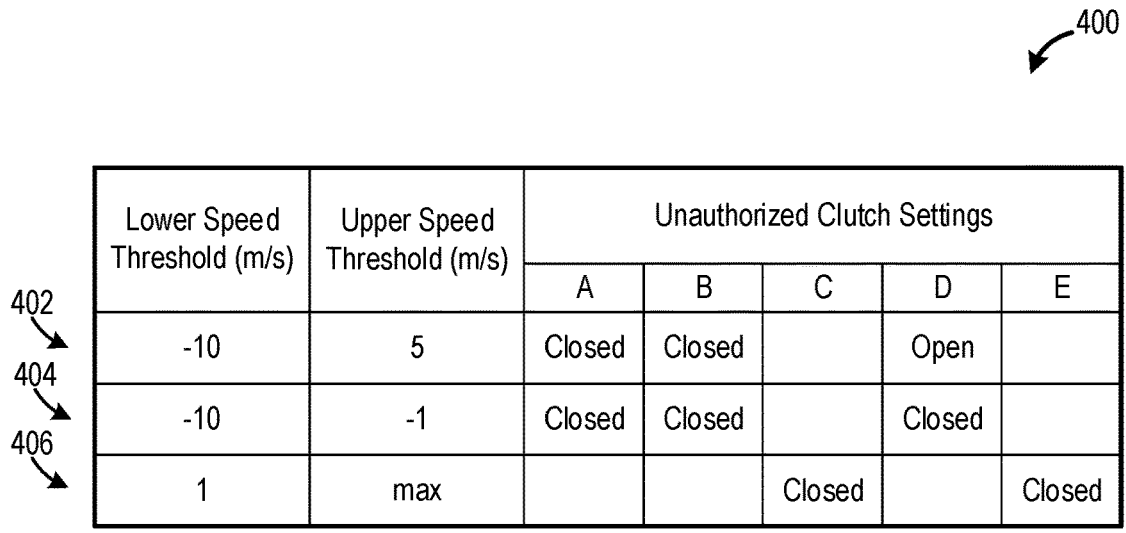
FIG. 4 is a lookup truth table depicting unauthorized operating conditions, for use with the control and diagnostic process shown in FIG. 3.
Figure 5:
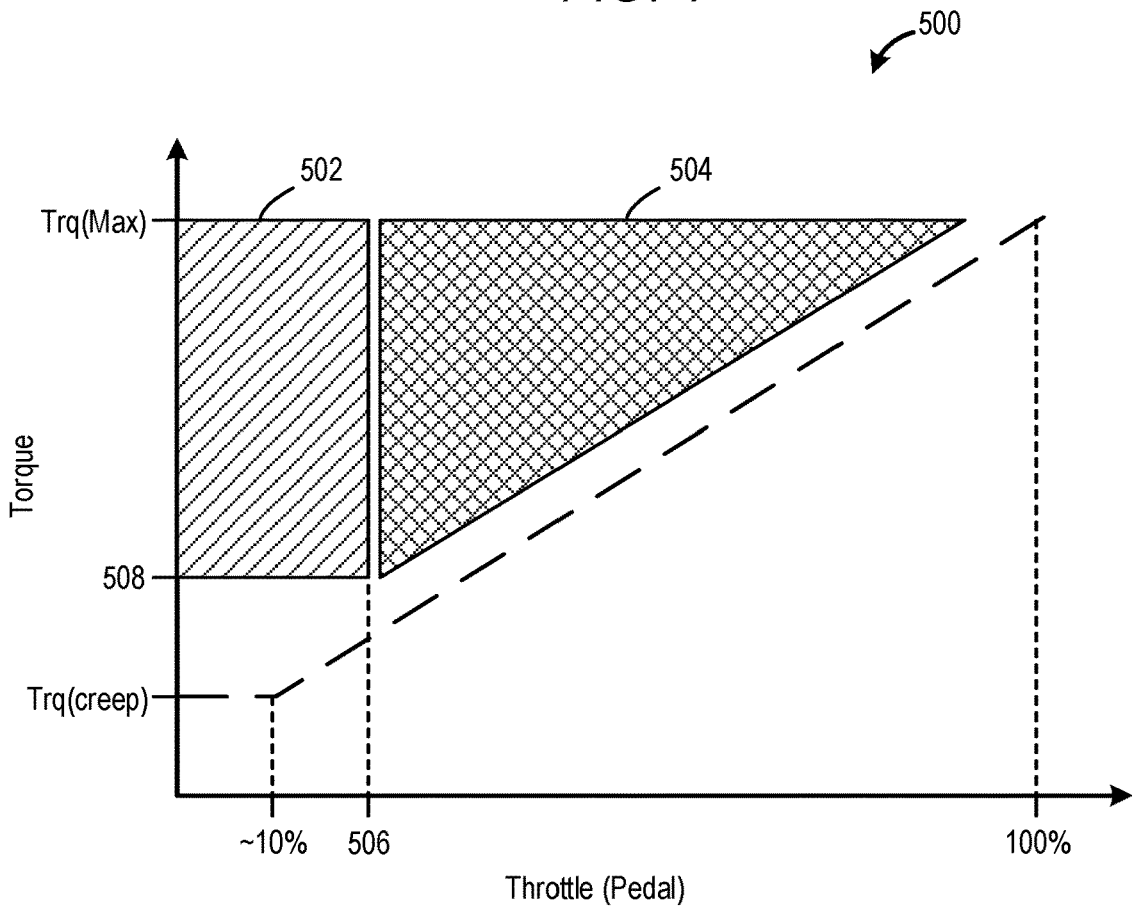
FIG. 5 is a graphical representation of unauthorized vehicle operating ranges.
Figure 6:
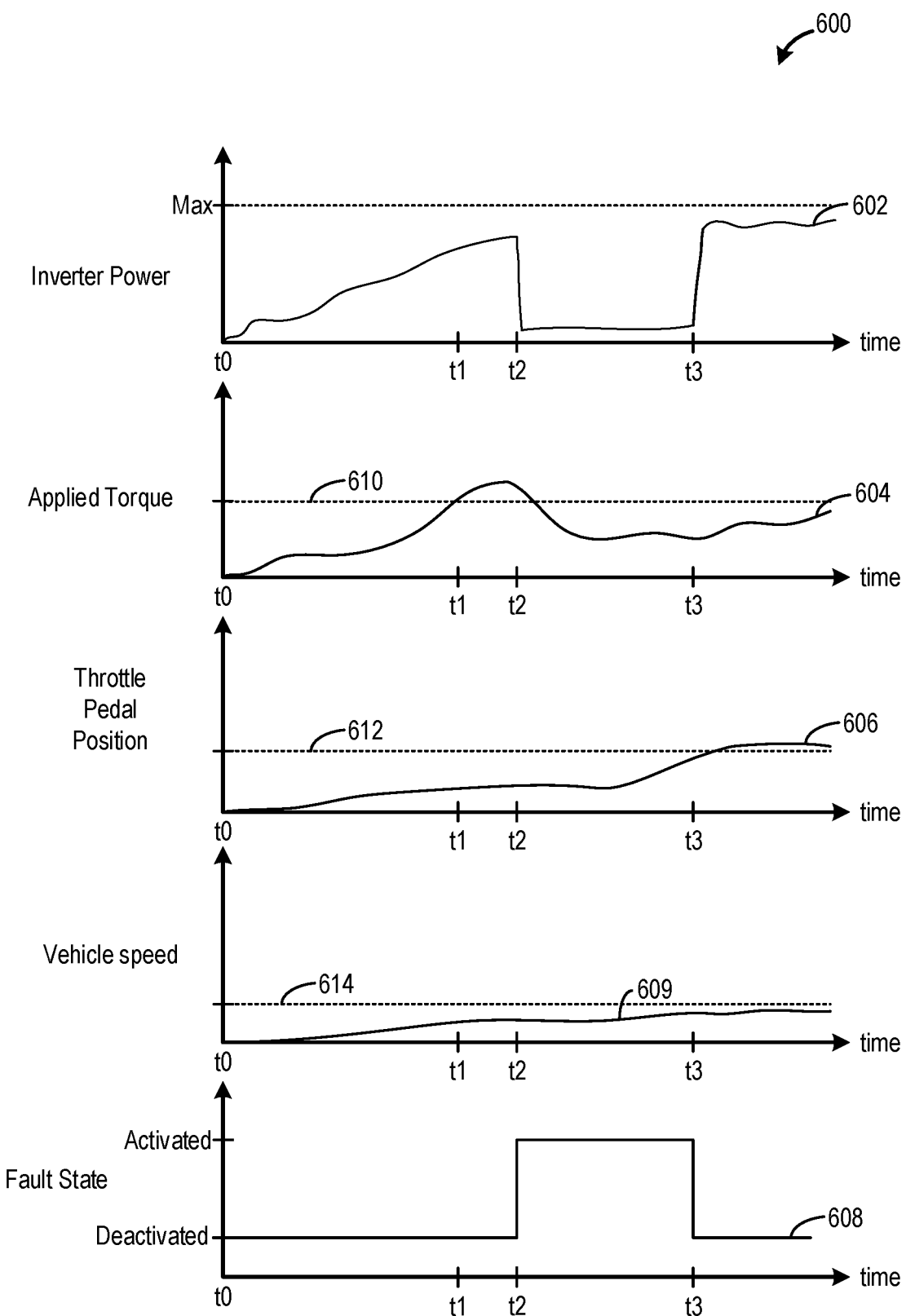
FIGS. 6-7 show timing diagrams depicting use-case control and fault diagnostic strategies.
Figure 7:
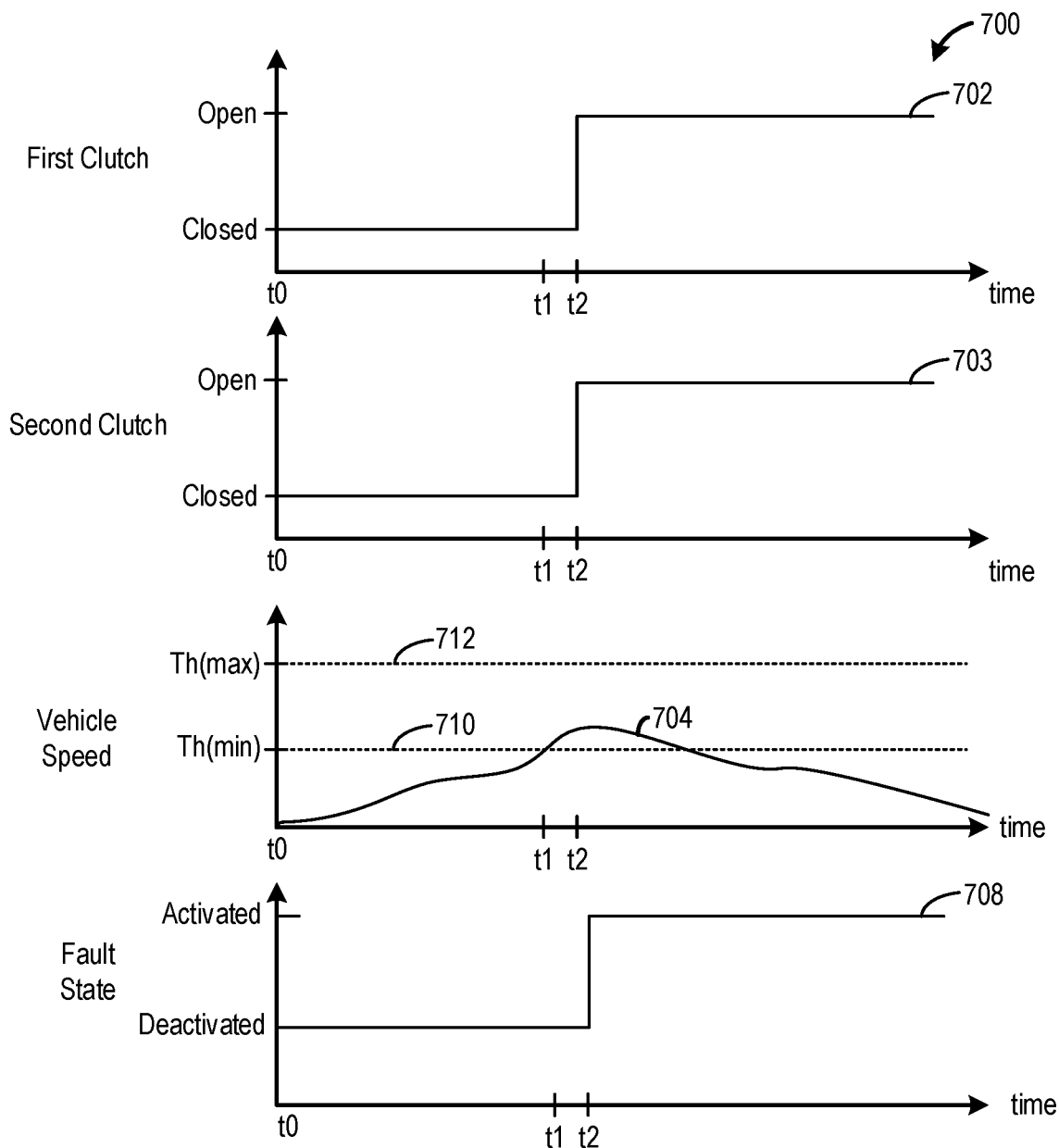

FIG. 1 illustrates a high-level vehicle system architecture that uses different controllers to execute a nominal control module and a diagnostic module. This configuration allows for diagnostic routines to be executed independently from, and in tandem with, nominal control strategies, resulting in a highly reliable setup that is easily implemented for a variety of driveline setups. FIGS. 2 and 3 depict flow charts illustrating methods for diagnosing mechanical component faults. FIG. 4 shows a lookup truth table for identifying unauthorized clutch conditions. FIG. 5 illustrates ranges of operating conditions that may indicate a mechanical component fault. FIGS. 6 and 7 depict timing diagrams of use-case control and diagnostic strategies for identifying fault conditions and operating a driveline component in a fault state, to avoid unwanted vehicle behavior.

FIG. 1 is a schematic illustration of a control and diagnostic architecture for a vehicle 100. The vehicle 100 may be a light, medium, or heavy duty vehicle designed for on and/or off-road travel. To elaborate, the vehicle may include a power source such as an internal combustion engine, an electric machine 104 (e.g., motor-generator), combinations thereof, and the like. Thus, the vehicle may be a hybrid vehicle or a battery electric vehicle (BEV), such as a single or multi-speed BEV, in different examples. Alternatively, the vehicle may be a combustion engine vehicle, and the electric machine 104 may be omitted.

A driveline controller 102, a driveline system 106 with a plurality of mechanical vehicle components, and an input device 108 may reside in a system 110 of the vehicle 100. The system 110 further includes a diagnostic controller 112 in communication with a driveline controller 102, driveline system 106, and an input device 108. These components may be in electronic communication (e.g., wired and/or wireless electronic communication) with one another to facilitate data transfer therebetween. The diagnostic controller 112 represents a driveline guard and may include a plurality of logic modules for monitoring and preventing a fault (e.g., unintended behavior) in the system 110, which will be discussed further with reference to FIG. 2. In one example, the diagnostic controller 112 and the driveline controller 102 may be distinct components which may be spaced away from one another.

In one example, the driveline controller 102 and the diagnostic controller 112 may each include a processor 114, 116 and a memory unit 118, 120, respectively, holding instructions stored therein that when executed by the processor cause the controller to perform various methods, control techniques, etc. described herein. The processors 114, 116 may include one or more processing units and/or other suitable types of circuits. The memory units 118, 120 may include known data and storage mediums, such as random access memory, read only memory, keep alive memory, combinations thereof, etc. The memory units 118, 120 may be distinct devices that execute separate logic modules (e.g., a driveline control module and a diagnostic module, respectively), in one example. The memory devices may therefore be collocated on a common board or chip, for instance, or may be spaced away from one another, in alternate configurations. To elaborate, the driveline controller 102 and the diagnostic controller 112 may be physically separate and distinct from the driveline memory unit 118 and diagnostic memory unit 120. For instance, the driveline controller and memory unit may be included on a first circuit board while the diagnostic controller and memory unit may be included on a second discrete circuit board. As such, the circuit boards may be at least partially housed in separate enclosures, in one example, or may be physically separate components collocated in a common enclosure, in another example. Alternatively, in other examples, a single controller with a multi-core processor (e.g., dual-core processor) may be used in the system. In such an example, the driveline control and diagnostic applications may be independently executed via distinct processing units (e.g., cores) and stored on separate memory units. In this way, the driveline control and diagnostic applications may retain independence while the controller achieves a more space and energy efficient architecture.

The processing unit(s) of the driveline controller 102 or diagnostic controller 112 may carry out different nominal control or diagnostic logic modules, respectively. As described herein, a logic module is a set of instructions (e.g., tasks, algorithms, and the like) that performs selected operations, functions, etc. when executed. Driveline controller 102 may include applications designed to implement control strategies for the mechanical component in the driveline system 106. Conversely, the diagnostic controller 112 may include applications for monitoring and verifying operation of the mechanical components in the driveline system 106. In this way, the diagnostic controller may act as a driveline guard. Further, separating the logic modules in this manner allows the control and diagnostic modules to be independent from one another, and may further allow for independent alteration of each, providing increased system adaptability. Further, the adaptability resulting from the independence of these applications may allow for efficient integration of diagnostic routines into an existing control architecture, as well as the ability to independently update or otherwise alter diagnostic and/or control architecture.

The components in the driveline system 106 may include an inverter 122, an electric machine 104 (e.g., motor-generator), a gearbox 124 that includes one or more clutches 126 and gears 128, a differential 130, etc. The electric machine 104 may be a motor for generating rotational energy to be transferred to vehicle wheels via an axle shaft, and may therefore include a rotor, stator, housing, and the like. In one example, the electric machine 104 may be a motor-generator which may act as a motor for generating rotational energy, and, conversely, as a generator for receiving rotational energy and transforming it into electrical energy.

The electric machine 104 may be an alternating current (AC) type motor or motor-generator, such as a multi-phase motor (e.g., three, six, or nine phase motor). In the case of a multi-phase motor or other suitable AC motor, electrical inverter 122 (e.g., multi-phase inverter such as a three, six, or nine phase inverter that matches the phases of the motor) is implemented to convert direct current (DC) power from a power source (e.g., battery, capacitor, other suitable energy storage devices, etc.) to AC power for consumption by the electric machine 104. Conversely, when the electric machine 104 acts as a generator, the inverter 122 may consume AC power and convert it to DC power to be stored in a suitable electric storage device, such as the aforementioned power source. Additionally, a sensor coupled to or integrated into the inverter 122 may be able to detect the torque applied by the electric machine 104 to be used at the diagnostic controller 112 in determining a fault condition, as will be described in further detail herein. For instance, a current sensor may be integrated into the inverter and designed to measure the current delivered to the electric machine. In turn, the electric machine's torque may be inferred from this current measurement. In other examples, when an internal combustion engine is used as the motive power source for the vehicle, the electric machine 104 and the inverter 122 may be omitted.

The driveline may further include a gearbox 124 with one or more clutches 126 and gears 128. Specifically, in one example, the gearbox may include five clutches which may open and close to activate and deactivate different set of gears. However, numerous gearbox and clutch arrangements have been contemplated. The gearbox 124 may be rotationally coupled to the electric machine 104, in one example. However, in an alternate example, the electric machine 104 may directly provide power to a drive wheel without a gearbox or other transmission components therebetween.

The clutches 126 may be engaged or disengaged to place the vehicle in forward, reverse, and neutral modes. Alternatively, for some transmissions, particularly those utilizing one or more electric machines as a power source, there may be no difference in clutch settings between forward and reverse modes, where the direction of travel is dictated by the direction of rotation of the electric machine. In other examples, the gearbox may have discrete gear ratios in the forward drive mode, as well as the reverse drive mode, in some cases. As such, the transmission is able to create different gear ratios to operate the vehicle in the aforementioned modes. For instance, the gearbox may have two or more discrete gear ratios which may be operator selectable and/or programmatically selected by the driveline controller based on vehicle speed and/or load. The gearbox 124 may be included in a transmission 125. In some examples, the transmission may be a dual-clutch automatic transmission (DCT), employing two input clutches which connect a pair of input shafts to a motive power source (e.g., engine, motor, motor-generator, etc.). One of the input clutches is used to drive even-numbered gears, while the other input clutch is used to drive odd-numbered gears. Further, in the DCT, synchronizers may be employed to establish power transfer between the input shafts and the transmission output. In some cases, the DCT may be a powershift transmission. Still further in some examples, the transmission may include more than two clutches, such as five clutches, for instance. The DCT is able to efficiently switch between gears by timing the operation of one clutch to engage as the other is disengaging so that there is no interruption of torque supply to the wheels during shifting, where the capability for smooth transitions between gear ratios may enhance vehicle drivability and shift quality. Additionally, or alternatively, the transmission 125 may a hybrid transmission with an integrated electric machine.

The gearbox 124 may be mechanically coupled to an axle for transmitting mechanical power to drive wheels. The gearbox 124 may receive mechanical power from, or transfer mechanical power to, the electric machine 104 (e.g., motor-generator) via a driveshaft and/or other suitable mechanical components. In some cases, the gearbox 124 may transfer mechanical power to or receive mechanical power from differential 130. The differential 130 may then transfer mechanical power to or receive mechanical power from the drive wheels via left and right axle shafts. The differential 130 may be a locking differential, an electronically controlled limited slip differential, or a torque vectoring differential, for example. When the differential has locking functionality, the differential may be operated in a locked or an unlocked configuration via a locking clutch 133 to selectively transfer mechanical power to or receive mechanical power from vehicle drive wheels via left and right axle shafts, in some cases.

The components in the vehicle system 110 may be monitored for faults by the diagnostic controller 112. The input device 108 is designed to receive operator input and responsively generate an input signal or command that is transmitted to the driveline controller 102 for controlling operation of one or more of the mechanical vehicle components within driveline system 106 described above. Hence, the input device 108 allows a vehicle operator to request adjustment of a vehicle operating parameter such as clutch configuration (e.g., open or closed), motor power, motor speed, engine power, engine speed, differential configuration (e.g., a locked or an unlocked configuration), etc. Examples of the input device include a drive pedal, gear selector, gear stick, clutch pedal, buttons, knobs, touch interfaces, combinations thereof, and the like.

The drive pedal (e.g., throttle pedal) may generate a signal indicative of a power request. During normal operation, the driveline controller may adjust the electric machine 104 and/or the inverter 122 to achieve a power set-point or range correlated to the operator power request.

Further, the operator may interact with the gear selector (e.g., a Reverse-Neutral-Drive shift selector), to select a drive mode (e.g., reverse drive, neutral, or forward drive). In a normal operating mode, responsive to selection of the drive mode, the driveline controller 102 may control the gearbox 124 to open or close one or more clutches 126 to place the gearbox in the selected mode. Alternatively, the driveline controller may adjust the electric machine to place the powertrain in the selected mode. In yet another example, the input device may include a differential actuator that initiates differential locking and unlocking operations. Hence, in the above described examples, a vehicle operator may request adjustment in wheel torque/power, transmission gear selection, differential configuration, etc. at their predilection, whereby, in a nominal mode of operation, the driveline controller 102 adjusts components in the driveline system responsive to the adjustment of the input device. However, more automated control strategies of at least a portion of the driveline components may be implemented, in other examples.

Although the driveline controller 102 receives requests from the input device 108 to control operation of the various mechanical vehicle components described herein, the diagnostic controller also monitors these requests and verifies if the control settings match a predefined set of undesired settings. Specifically, the diagnostic method may not take into account intended component settings and instead focus on comparing the actual settings with a predefined set of unwanted settings, to simplify diagnostics. When one of the control settings matches one of the undesired settings in the predetermined set, the diagnostic controller 112 may override the driveline controller 102 in order to operate the mechanical vehicle component in an active fault state. In one example, the diagnostic controller, upon identifying a fault condition (e.g., an unverified condition), may trigger an active fault state, as indicated at 144, by removing the closing force applied to the one or more clutches to bring them into an opened state, thus inhibiting transfer of power through the clutches. This command may override a driveline control command to disengage the clutches or sustain disengagement of the clutches. In this way, unintended vehicle acceleration or deceleration may be circumvented.

In another example, upon identifying a fault condition, the diagnostic controller 112 may trigger an active fault state by interrupting the transfer of AC power from the inverter 122 to the electric machine 104 (e.g., by opening one or more switches in the inverter 122 or otherwise decreasing the electric power flow from the inverter to the electric machine). As such, current flow from the inverter to the electric machine may be stopped or significantly decreased when the fault condition is identified. In yet another example, when the component is differential 130, the diagnostic controller, upon identifying a fault condition, may trigger an active fault state by unlocking the differential. By allowing the diagnostic controller 112 to override the nominal control commands from the driveline controller 102 during a fault condition, the system may effectively and efficiently execute diagnostic routines with higher accuracy to quickly discontinue or avoid undesired kinematic behavior of the vehicle.

In FIG. 1, linear arrows characterize the high level data flow pattern in the system. To elaborate, arrows 132, 134 indicate the transfer of data between the input device 108 and the driveline system 106, respectively, and the driveline controller 102. Additionally, arrow 136 indicates the transfer of data between the driveline controller 102 and the driveline system 106. Arrows 138, 140 indicate the transfer of data redirected from input device 108 and from driveline controller 102, respectively, to the diagnostic controller 112. Arrow 142 indicates the transfer of data from the diagnostic controller 112 to the mechanical vehicle component of the driveline system 106, for triggering an active fault state 144. As such, each arrow indicates data that may be sent from controller hardware to a vehicle component and received by said vehicle component, or vice versa.

The driveline controller 102 and/or diagnostic controller 112 may receive inputs from sensors such as a current sensor 123 coupled to or integrated within the inverter 122, one or more clutch position sensor(s) 127, an input device position sensor 109, an electric machine speed sensor 105, a differential position sensor 131, and the like. In some examples, both the driveline controller and/or diagnostic controller may receive sensor inputs in parallel. In one example, the driveline controller 102 may receive the sensor signals and relay these signals to the diagnostic controller 112. Alternatively, at least a portion of the sensor signals may be sent in parallel to the diagnostic controller 112 and the driveline controller 102.

FIG. 2 illustrates a method 200 for vehicle system operation and fault diagnostics. The method 200 as well as other methods described herein may be executed by the diagnostic controller 112, driveline controller 102, and vehicle system 110 shown in FIG. 1. Alternatively, the method 200 and/or the other methods described herein may be implemented by other suitable controllers, vehicle system, and corresponding components or by a common controller with multiple processors and memory units that separately execute control and diagnostic modules. Further, the instructions for carrying out the method 200 and the rest of the methods described herein may be executed by one or more controllers based on instructions stored on different memory units and in conjunction with signals received from the vehicle system. The controller(s) may employ actuators of the vehicle system to adjust vehicle operations, according to the methods described below.

At 202, the method collects vehicle operating data from various components in the vehicle system, via a capture unit of a controller, for example. The method 200 may determine vehicle operating data based on output from various sensors and actuators described herein. In some examples, the capture unit determines an input device state. In one example, a drive device (e.g., throttle pedal) request from a vehicle operator may be determined via a throttle pedal sensor. In another example, a position of a gear selector (e.g., R-N-D shifter) may be used to determine a gear selector request. The capture unit may further determine a torque applied by the electric machine (e.g., motor-generator), which may be inferred from an inverter current flow. The capture unit may further determine the position of one or more clutches, and an actual vehicle speed measured via a speed sensor.

At 204, the method determines whether the measured actual vehicle speed is below a speed threshold value. The speed threshold may be a fixed value or a dynamic value that may be adjusted depending on the application and/or vehicle operating environment. In some examples, the speed threshold value may be a relatively low or medium vehicle speed, such as approximately 1 meters per second (m/s) or 5 m/s.

It will be understood that when vehicle speed is below the threshold, a fault leading to unintended vehicle movement may be noticeable by the operator and thus may demand the calculation (e.g., prediction) of wheel torque. In other words, when a low vehicle speed is determined, wheel torque is then slated for calculation. On the other hand, when vehicle speed exceeds the threshold, unintended vehicle acceleration or deceleration may be less noticeable by the operator. For example, at higher speeds, changes in vehicle speed caused by erroneous clutch settings may be substantially unperceivable. As a result, at higher speeds the wheel torque calculation and subsequent diagnostic steps may be circumvented. In this way, the system focuses on preventing unintended vehicle behavior based on a torque monitoring function, as opposed to relying on a torque setting function of an inverter controller coupled to an electric machine to identify a fault condition, thus providing an efficient cost-effective system for avoiding unwanted behavior by eliminating the need for costly inverter controller development. As such, the driveline system described herein may place constraints on the torque monitoring settings of the electric machine as opposed to the torque setting functions.

If the vehicle speed exceeds the speed threshold value (NO at 204), the method moves to 206 where the method maintains the current vehicle operating strategy. In order to maintain the current vehicle operating strategy, a driveline controller may continue to send control commands, based on operator input from an input device or through automatic control routines, to various mechanical vehicle components of the driveline system. In some instances, this may involve continuing to augment power supplied to the electric machine based on an increased drive pedal (e.g., throttle pedal) input, or, in other instances, may involve opening or closing clutches to achieve a desired gear ratio as dictated by a gear selector input, vehicle speed, and/or vehicle load.

Conversely, if the vehicle speed is below the speed threshold value (YES at 204), the method moves to 208, where the method determines (e.g., predicts) the torque applied at the vehicle wheels, also referred to as the wheel torque. For example, wheel torque may be derived from the torque of one or more electric machines, which may be depend up the current supplied to the electric machines from an inverter. Further, this calculation may take into account the one or more clutch positions, as determined at 202, and the specific gearbox configuration. For instance, the clutch positions may be mapped to the active gear ratio in the gearbox and said gear ratio may be used along with electric machine torque to calculate the drive wheel torque. Further, the applied wheel torque may be determined to be zero if the gearbox includes a neutral clutch in an open position. However, in alternate configurations, when an electric machine is coupled directly to the output of a vehicle wheel shaft, the clutch positions may not be taken into account when predicting wheel torque. In these configurations, the drive wheel torque may be determined via a fixed multiplication of the electric machine torque and the output shaft reduction ratio.

At 210, the method determines if the calculated wheel torque is above a torque threshold value (e.g., a positive non-zero value). The torque threshold may be a fixed or dynamic value, depending on the application and/or vehicle operating environment. The torque threshold may be a relatively low torque value. Further, the torque threshold may be specific to a vehicle type (e.g., commercial vehicle, passenger vehicle, etc.) and selected to cause the vehicle to begin moving from a standstill on a flat surface. For example, when the vehicle is a truck, the torque threshold may be 50 Newton-meters (Nm), wherein a torque below the torque threshold will not cause the vehicle to move. In other examples, however, such as when a method is used to guard against unintended vehicle acceleration while the vehicle is moving, a torque threshold may be significantly higher (e.g., 200 Nm), corresponding to a torque that would cause unwanted acceleration at higher vehicle speeds.

If the wheel torque is below the torque threshold (NO at 210), the method again moves to 206. Conversely, if the wheel torque exceeds the torque threshold (YES at 210), the method moves to 212 where the method determines if the wheel torque is in a direction opposite the intended direction or if an operator power request exceeds a threshold value. The method may judge if the wheel torque is in an opposite direction than intended to ascertain if the vehicle is traveling in a direction that is opposite than what is intended. On the other hand, the method may judge if the operator power request exceeds the threshold value to ascertain if undesired longitudinal accelerator of the vehicle is occurring. In some examples, the method may utilize clutch positions along with the wheel torque to determine if the wheel torque is in a direction opposite the intended direction. However, in some cases, such as where one or more electric machines are implemented to power vehicle drive operations, monitoring clutch settings to determine the wheel torque and the direction thereof may be forgone as there is no difference in clutch settings in forward and reverse drive modes, in such an example. In these cases, the direction of vehicle movement may be determined by the direction of the electric machine torque. By calculating and verifying the actual wheel torque and direction of torque applied by the electric machine for fault monitoring, as opposed to monitoring actual clutch settings, a reliable system is provided for diagnosing a fault condition in a variety of driveline configurations.

The power request threshold may be a predetermined value, in one example. Further, the power request may be expressed as a percentage of throttle pedal depression, such that zero power request corresponds to 0% throttle depression. The power threshold may be a zero power request or a relatively low value, such as 15%, 20%, or 25% pedal depression, in certain use-cases.

If the wheel torque is in the intended direction or the operator power request is not greater than the threshold value (NO at 212), the method moves to 206. However, if the wheel torque is determined to be in a direction opposite the intended direction or the operator power request is greater than the threshold value (YES at 212), a fault condition is identified and the method moves to 216.

When step 212 judges if the power request exceeds the threshold, method 200 provides efficient and confident identification of a fault condition where excessive drive torque is applied to the vehicle wheels in the case of no or low throttle demand, which may result in unintended longitudinal vehicle acceleration. Alternatively, when step 212 judges if the wheel torque is in the opposite direction as intended, method 200 provides rapid and robust identification of a fault condition where the vehicle is traveling in an opposite direction.

At 216, the method determines the duration of the fault condition (e.g., the time passed since identification of the fault condition), as determined in the aforementioned steps, and verifies the fault duration against a fault tolerant time.

The fault tolerant time may be a predetermined value or may be configurable depending on the application or operating environment. Further, the fault tolerant time may define a duration of time beyond which the mechanical vehicle component operation may lead to unintended kinematic behavior that is perceivable by the operator. Further, the fault tolerant time may be chosen so as to prevent misidentification of a fault condition by selecting a time that takes into account component control latency and/or driveline component characteristics. For example, some transmissions may experience a delay in engagement of clutches and gears during a shift event. The fault tolerant time may take this delay into account and allow for some lag in engagement before triggering an active fault state, as shifting transients may not be indicative of unintended vehicle behavior. Using a fault tolerant time as an entry condition for activation of a fault state allows the current system to avoid mistakenly identifying a fault condition and/or operating the component in an active fault state when compared to other systems that may instantaneously activate a fault mode when the driveline component settings do not match monitored values.

If the fault duration is less than the fault tolerant time (NO at 216), the method moves to 206 where the method maintains the current vehicle operating strategy. For instance, the driveline component may continue operation in a nominal mode where it is adjusted based on operator requested torque and vehicle load, for instance. After 206, the method returns to 202. However, if the fault duration exceeds the fault tolerant time (YES at 216), the method continues on to 218.

At 218, the diagnostic controller triggers an active fault state of the mechanical vehicle component. Thus, at 220, the mechanical vehicle component is operated in the active fault state. Operating the component in the fault state, via a diagnostic controller, may include overriding nominal control commands generated by the driveline controller. For example, when the mechanical component is a plurality of clutches, the nominal control command may be to sustain clutch engagement and the fault state may be implemented by removing either all or most of the torque applied to the vehicle wheels by removing the closing force of the clutches, to bring the clutches into an opened state. In other examples, where the mechanical component is an electrical inverter, the fault state may be realized by overriding a nominal control command to supply the motor with AC power from the inverter, thus interrupting (e.g., halting or significantly inhibiting) the transfer of AC power delivered to the electric machine from the inverter. For instance, one or more switches in a multiphase inverter may be opened to decrease the power transfer to the electric machine. In this way, unintended vehicle component behavior that may cause unwanted vehicle motion may be quickly identified and discontinued. Consequently, the driveline system provides more predictable performance, as perceived by the operator. When the mechanical component is a differential locking clutch, operating the locking clutch in the fault state may include disengaging the clutch which may override a command to lock the differential.

FIG. 3 shows another method 300 for fault diagnostics of clutches in a vehicle system. At 302, the method collects vehicle operating data from the vehicle system via a capture unit of a controller. For example, a speed sensor may be used to measure an actual vehicle speed. Further, at 302, the controller determines the position of one or more clutches (e.g., whether each clutch is in an opened or closed state). To elaborate, the gearbox's clutch settings may be identified as either engaged or disengaged. Further, in certain cases, the clutch settings may be identified as being partially engaged or disengaged.

At 304, the method verifies the clutch settings against a lookup truth table to identify a fault condition. The lookup truth table may include upper and lower vehicle speed thresholds that correspond to clutch positions that may invalidate the clutch settings. In other examples, the lookup truth table may indicate other ranges of operating parameters to identify unauthorized conditions. The truth table may therefore express sets of conditions (e.g., clutch positions, vehicle speeds, etc.) that are unwanted. One exemplary truth table is described in greater detail herein with regard to FIG. 4. Next, at 306, a determination is made as to whether or not the operating conditions are authorized.

If the vehicle speed and clutch positions are authorized based on the truth table verification (YES at 306), the method moves to 308 where the current vehicle operating strategy is maintained, such that, for instance, clutch positions are controlled by commands from a driveline controller. If the vehicle speed and clutch positions are determined to be unauthorized (NO at 306), a fault condition is identified and the method moves to 312.

At 312, the method determines the duration of the fault condition (e.g., the time passed since the identification of the fault condition), as determined in the aforementioned steps, and verifies the fault duration against a fault tolerant time, as previously described. If the fault duration is less than the fault tolerant time (NO at 312), the method moves to 308 to maintain the current vehicle operating strategy. However, if the fault duration exceeds the fault tolerant time (YES at 312), the method continues to 314. Using the fault tolerant time permits diagnostic confidence to be further increased.

At 314, the method triggers an active fault state in the plurality of clutches. Thus, at 316, one or more of the clutches is/are operated in the active fault state. Again, operating the clutches in an active fault state may include opening the clutches to inhibit torque transfer from the transmission to the drive wheels and overriding a command to close the clutches. Operating a clutch for a differential locking device may include opening a locker clutch to discontinue differential locking. Method 300 enables unauthorized clutch setting which may lead to unanticipated vehicle deceleration to be quickly and confidently determined. Subsequent to the rapid determination of the unauthorized clutch positions, steps are taken to discontinue the unauthorized clutch settings. Unanticipated changes in driveline performance may therefore be mitigated.

FIG. 4 depicts an exemplary lookup truth table 400 for verifying a vehicle speed against clutch settings. The lookup truth table 400 may be stored in a memory unit of a diagnostic controller (e.g., the memory unit 120 and diagnostic controller 112, shown in FIG. 1). Rows of the lookup truth table 400 are populated with lower and upper speed thresholds that correspond to a plurality of unauthorized clutch position settings (e.g., open or closed). To elaborate, unauthorized clutch position settings are provided for five clutches, A-E, during vehicle operation within predefined vehicle speed ranges. However, lookup truth tables with an alternate number of clutches may be used, in other examples.

In a diagnostic routine, the diagnostic controller may determine a vehicle speed and a plurality of clutch position settings, and compare the speed and clutch position settings against the lookup truth table in order to determine unverified conditions indicative of a fault condition. In other words, the diagnostic controller may use lookup truth table 400 to verify actual vehicle settings against a predefined and constrained set of unauthorized settings. In this way, a simpler and more reliable system is provided for diagnosing the mechanical component when compared to diagnostic systems that determine requested or intended component settings against actual component settings. When verifying vehicle speed and clutch positions against lookup truth table 400, multiple clutch conditions may lead the diagnostic controller to determine an unauthorized setting is present. For instance, the lookup truth table 400 in a first row 402 indicates, in one example, a lower speed threshold of −10 m/s, and an upper speed threshold of 5 m/s. When the vehicle travels at a speed between −10 m/s and 5 m/s, an unverified clutch condition may be identified if: clutch A is closed, clutch B is closed, and clutch D is open. In the second row 404 of the lookup truth table, an unauthorized setting conclusion may be reached when the vehicle speed is between −10 m/s and −1 m/s and clutch A is closed, clutch B is closed, and clutch D is closed. In the third row 406 of the lookup truth table, the controller may determine that an unauthorized setting is occurring when the vehicle speed is greater than 1 m/s and clutches C and D are both closed.

In other examples, a single clutch condition may lead to an unauthorized setting conclusion. For instance, in the third row of the lookup truth table when the vehicle speed is greater than 1 m/s and clutch E is closed, the diagnostic controller may judge that an unauthorized clutch setting is occurring. Further, an unknown or indeterminable clutch position may be considered an unverified condition. Even further, an unknown or indeterminable vehicle speed may also be considered an unverified condition indicative of a fault.

The diagnostic controller may recognize any of the aforementioned settings as a fault condition, and may trigger an active fault state to operate the clutches in a fault mode (e.g., by opening one or more of clutches A-E). The truth table 400 allows for confident diagnosis of the clutches by providing unverified conditions known to cause unwanted changes in vehicle kinematic performance (e.g., unintended vehicle acceleration/deceleration). Thus, the diagnostic routine may not rely solely on comparing intended clutch settings against actual clutch settings, which may lead to unwarranted triggering of the fault state that may hamper vehicle performance, and a more efficient and reliable diagnostic routine that guards against unacceptable clutch conditions is possible.

FIG. 5 shows a diagram 500 which illustrates ranges of vehicle operating conditions that may indicate a mechanical component fault. Diagram 500 includes a horizontal axis which indicates a drive device input from an operator, such as a throttle pedal position. The throttle pedal position is represented as a percentage of throttle pedal depression, increasing along the horizontal axis in the direction of the arrow. Diagram 500 further includes a vertical axis indicating a wheel torque applied at the vehicle drive wheels, increasing to a maximum torque value in the direction of the arrow. Diagram 500 also includes a throttle threshold 506 and a torque threshold 508.

Vehicle operating conditions where the wheel torque exceeds torque threshold 508 and throttle pedal depression is less than throttle threshold 506, shown at region 502, may be recognized as unauthorized settings, which may lead to unintended longitudinal vehicle acceleration. To elaborate, a relatively low throttle request (below throttle threshold 506) may indicate that vehicle acceleration is not desired, such that excessive wheel torque (above torque threshold 508) may lead to unwanted acceleration. Thus, a throttle request and wheel torque falling within region 502 may be recognized by a diagnostic controller as a fault condition, and the diagnostic controller may, after the fault tolerant time is exceeded, operate the mechanical component in a fault state, in order to discontinue or altogether avoid unwanted vehicle acceleration. Triggering the active fault state may include, in some cases, bringing the gearbox clutches into an open state so as to prevent further transfer of power to the vehicle drive wheels, thus reducing the chance of further unintended acceleration.

Also shown in FIG. 5 is a region 504, which indicates a range of operating conditions in which unintended torque transfer between the motor and the wheels is occurring but is controllable. Therefore, unlike fault region 502, when the driveline is operating under conditions within region 504, control settings may be altered as opposed to operating the driveline component in a fault state. Specifically, region 504 depicts a scenario where a throttle request exceeds throttle threshold 506. Therefore, in region 504 the torque request may be removed to avoid unintended acceleration. Thus, for vehicle operating conditions falling within region 504, it may not be desirable to trigger an active fault state of a mechanical vehicle component. It is therefore possible to avoid superfluous triggering of the active fault state which may degrade vehicle performance.

Diagram 500 further indicates a creep torque, as shown via a dashed line. In some cases, a small amount of creep torque may be applied at the vehicle wheels in the case of a 0% throttle request. Torque threshold 508 is selected so as to be greater than the creep torque level, as the small amount of creep torque applied may not warrant fault mode activation. Hence, the system may further avoid unwarranted triggering of the active fault state.

FIG. 6 illustrates a timing diagram 600 of a use-case diagnostic control strategy for a mechanical vehicle component. In each plot of the timing diagram, time is indicated on the abscissa and increases in the direction of the arrow. The ordinate for plot 602 indicates the level of electric power transferred from the inverter to the electric machine, and the ordinate for plot 608 indicates the fault state (activated and deactivated). The ordinate for plot 604 indicates torque applied to the wheels, which increases in the direction of the arrow. The ordinate for plot 606 indicates a throttle pedal position, which may be expressed as a percentage of throttle pedal depression which increases in the direction of the arrow. The ordinate for plot 609 indicates a vehicle speed that increases in the direction of the arrow. FIG. 6 also shows a torque threshold 610, and a throttle threshold 612 (e.g., 15%, 14%, or 12%), and a vehicle speed threshold 614 (e.g., 5 m/s, 3 m/s, or 1 m/s).

From t0 to t1, vehicle speed is less than the threshold 614, throttle pedal depression is less than the threshold 612, and the inverter begins to transfer AC power to the electric machine. Thus, the applied torque increases from t0 to t1. However, when the applied torque surpasses the torque threshold 610 at t1, and the throttle pedal position remains below the threshold 612, the diagnostic controller recognizes that an unauthorized condition is occurring.

From t1 to t2, the diagnostic controller measures the duration of the unauthorized condition. The time between t1 and t2 may be the fault tolerant time described above, which may be implemented as an entry condition for the fault state of the inverter. At t2, the duration of the unauthorized condition meets the fault tolerant time, and the diagnostic controller triggers an active fault state where the AC power delivered by the inverter to the electric machine significantly and abruptly decreases. In this way, the torque applied at the wheels may also decrease, and undesired vehicle acceleration caused by the interaction between the inverter and the electric machine is avoided. In some cases, the applied torque may decrease to a level below the threshold 610, yet the controller may continue to recognize the vehicle operating condition(s) as unauthorized when the throttle pedal depression remains below the threshold 612.

From t2 to t3, the throttle pedal depression increases and the applied torque may continue to increase accordingly, as the fault state remains activated. However, when the throttle pedal position (e.g., request) surpasses throttle threshold 612 at t3, the diagnostic controller deactivates the fault state, and the inverter may resume normal transfer of AC power to the electric machine.

FIG. 7 illustrates another timing diagram 700 of a use-case diagnostic control strategy for a mechanical vehicle component. In each plot of the timing diagram, time is indicated on the abscissa and increases in the direction of the arrow. The ordinates for plots 702, 703 indicate the actual clutch position setting (open and closed) of a first clutch and a second clutch, and the ordinate for plot 704 indicates the vehicle speed, which increases in the direction of the arrow. The ordinate of plot 708 indicates the fault state (activated and deactivated). FIG. 7 also shows lower and upper vehicle speed thresholds 710 and 712, respectively.

From t0 to t1, vehicle speed increases while in the first and second clutches are closed. In some cases, a diagnostic controller may determine the vehicle speed and the clutch positions and verify these settings against a lookup truth table, such as table 400 shown in FIG. 4, to identify unauthorized clutch positions indicative of a driveline fault.

At t1, the vehicle speed enters a region between the lower speed threshold 710 and the upper speed threshold 712, and the diagnostic controller recognizes that the while the clutches are closed and within the speed range between the upper and lower an unauthorized setting is occurring. Thus, the diagnostic controller recognized that an unauthorized clutch condition is present.

From t1 to t2, the diagnostic controller measures the duration of the unauthorized settings. The time between t1 and t2 may be the fault tolerant time described above, which may be used as an entry condition for activating the fault state of the first and second clutches. At t2, the duration of the fault state reaches the fault tolerant time, the fault state is activated by operating the plurality of clutches in an open state. After t2, as the vehicle speed remains above lower speed threshold 710 and below upper speed threshold 712, the fault state remains active, and the clutches are maintained in an open position. Thus, invalid clutch setting may be quickly and confidently recognized using the unauthorized clutch positions mapped to a speed range and then discontinued to reduce the likelihood of unwanted vehicle deceleration or acceleration.

The technical effect of the driveline systems and methods described herein is to efficiently and confidently diagnose driveline faults through the use of a predetermined set of unauthorized component settings and avoid unwanted vehicle behaviors that may cause unanticipated changes in driveline performance such as unintended acceleration or movement of the vehicle in an unintended direction.

The invention will be further described in the following paragraphs. In one aspect, a method is provided for operation of a vehicle system, comprising: at a diagnostic controller or processing unit independent from a driveline controller or processing unit, respectively, determining vehicle speed from a vehicle speed sensor; determining a position of a plurality of clutches in a transmission of the vehicle system; identifying an unauthorized clutch state based on the clutch positions and a vehicle speed; and responsive to the identification of the unauthorized clutch state, operating the plurality of clutches in a fault state. In one example, the unauthorized clutch state may be identified by comparing the vehicle speed and the clutch position against a lookup truth table; and rows of the lookup truth table comprise lower and upper speed thresholds corresponding to a plurality of unauthorized clutch position settings. In another example, the plurality of clutches may be operated in the fault state only when the unauthorized clutch state exceeds a fault tolerant time. In yet another example, the fault tolerant time may be a fixed value. In another example, the steps of determining the vehicle speed, determining the vehicle speed, determining the position of the plurality of clutches, identifying the unauthorized clutch state, and operating the plurality of clutches in the fault state are implemented by the diagnostic controller distinct from the driveline controller. In another example, the method may include, at the driveline controller, while the plurality of clutches are not in the unauthorized clutch position, operating the plurality of clutches based on operator instructions with an input device. In another example, the steps of determining vehicle speed, determining the position of the plurality of clutches, identifying the unauthorized clutch state, and operating the plurality of clutches in the fault state are implemented by the diagnostic processing unit distinct from a driveline processing unit and wherein the diagnostic processing unit and the driveline processing unit may be included in a vehicle controller. In another example, operating the plurality of clutches in the fault state includes disengaging one or more of the plurality of clutches. In another example, the plurality of clutches may be operated in the fault state by overriding commands from the driveline controller or processing unit.

In another aspect, a method is provided for operation of a vehicle system. The method comprises at a diagnostic controller independent from a driveline controller, determining vehicle speed from a vehicle sensor; determining a position of a plurality of clutches in a transmission of the vehicle system; identifying an unauthorized clutch state by comparing the vehicle speed and the clutch positions against a lookup truth table; and responsive to the identification of the unauthorized clutch state and when the unauthorized clutch state exceeds a fault tolerant time, operating the plurality of clutches in a fault state. In one example, rows of the lookup truth table may comprise lower and upper speed thresholds corresponding to a plurality of unauthorized clutch settings. In another example, operating the plurality of clutches in the fault state may include disengaging one or more of the plurality of clutches by overriding commands from the driveline controller or processing unit to prevent torque transfer to a plurality of drive wheels from the transmission. In yet another example, the plurality of clutches may be included in an automatic transmission or a hybrid transmission.

In yet another aspect, a vehicle system is provided that comprises a transmission including a plurality of clutches selectively engaging and disengaging to place the transmission in one of a plurality of discrete gear rations; a diagnostic controller or processing unit including: instructions that when executed cause the diagnostic controller or processing unit to: determine a vehicle speed from a vehicle speed sensor; determine a position of the plurality of clutches; and identify an unauthorized clutch state based on the clutch positions and a vehicle speed; and instructions that when executed, while the unauthorized clutch state persists longer than a fault tolerant time, cause the diagnostic controller or processing unit to: operate the plurality of clutches in a fault state.

In any of the aspects or combinations of the aspects, the unauthorized clutch position may be identified using a lookup truth table.

In any of the aspects or combinations of the aspects, in the lookup truth table, a single condition may be used to identify the unauthorized clutch state.

In any of the aspects or combinations of the aspects, the fault tolerant time may be dynamic and is adjusted based on one or more vehicle operating conditions.

In any of the aspects or combinations of the aspects, the transmission may be an automatic transmission.

In any of the aspects or combinations of the aspects, the transmission may be a hybrid transmission.

In any of the aspects or combinations of the aspects, the plurality of clutches may comprise a locking clutch included in a differential.

In another aspect, a method is provided for operation of a vehicle system with an electric machine, comprising: at a diagnostic controller or processing unit independent from a driveline controller or processing unit, respectively, determining an input device state and an electric machine torque; determining a fault condition of a vehicle component based on the input device state and the electric machine torque; and in response to determining the fault condition, triggering a fault state of the vehicle component and controlling the vehicle component in a fault mode. In one example, the steps of determining the input device state, determining the fault condition, and triggering the fault state may be implemented in a diagnostic core independent from a driveline core in a vehicle controller; and controlling the vehicle component may include overriding control commands from the driveline core. In another example, the steps of determining the input device state, determining the fault condition, and triggering the fault state may be implemented in the diagnostic controller independent from the driveline controller; and controlling the vehicle component may include overriding control commands from the driveline controller. In yet another example, the input device state may be a power request; and the method may further comprise: determining a predicted wheel torque based on the electric machine torque; and determining the fault condition determining the fault condition may include determining that a fault condition is occurring when the predicted wheel torque is greater than a threshold value and the power request is less than a threshold value. In another example, the input device state may be a gear selector position; and the method may further comprise: determining a predicted wheel torque based on the electric machine torque; and determining the fault condition may include determining the fault condition is occurring when the predicted wheel torque is greater than a threshold value and is in a direction that is opposite than a direction selected by the gear selector. In another example, the vehicle component may be a gearbox that includes one or more clutches, wherein controlling the gearbox includes opening the one or more clutches. In another example, the vehicle component may be an inverter, wherein controlling the inverter in the fault mode includes decreasing a flow of power from the inverter to the electric machine. In another example, the step of determining the fault condition may be determined while a vehicle speed is less than a threshold value, and the method may further comprise inhibiting the determination of the fault condition when the vehicle speed is greater than the threshold value. In another example, the fault state may be triggered when the fault condition persists for a duration greater than a threshold value.

In another aspect, a method is provided for operation of a vehicle system with an electric machine. The method comprises operating a diagnostic processing unit in a controller to: determine an electric machine torque; derive a wheel torque from the electric machine torque; and responsive to the wheel torque exceeding a threshold value, trigger a fault condition corresponding to one of an inverter, electric machine, or gearbox, and overriding control of the inverter, electric machine, or gearbox by a driveline processing unit. In one example, the fault condition may be triggered when a vehicle speed is less than a threshold value. In another example, the fault condition may be a condition where wheel direction is opposite of a requested wheel direction.

In another aspect, a vehicle system is provided that comprises a diagnostic controller or processing unit in electronic communication with a mechanical vehicle component and including: instructions that when executed cause the diagnostic controller or processing unit to: determine an input device state (e.g., power request {throttle request from throttle pedal} or gear selector position) and an electric machine torque; and determine the occurrence of a fault condition based on the input device state and the electric machine torque; and instructions stored in the memory unit that when, the fault condition is triggered, cause the diagnostic controller or processing unit to: control the mechanical vehicle component in a fault state; and override vehicle component control from a driveline controller or processing unit.

In any of the aspects or combinations of the aspects, the input device state may be a power request from a pedal; and the occurrence of the fault condition may be determined when a wheel torque derived from the electric machine torque is greater than a threshold value and the power request is less than a threshold value.

In any of the aspects or combinations of the aspects, the input device state may be a position of a gear selector; the occurrence of the fault condition may be determined when a wheel speed is in a direction opposite than a direction requested by the gear selector; and the wheel speed may be derived from the electric machine torque.

In any of the aspects or combinations of the aspects, the mechanical vehicle component may be an inverter, an electric machine, or a gearbox that includes one or more clutches.

In any of the aspects or combinations of the aspects, when the mechanical component is an inverter, controlling the inverter in the fault state may include decreasing a flow of power from the inverter to the electric machine.

In any of the aspects or combinations of the aspects, when the mechanical component may be a gearbox, controlling the gearbox may include opening the one or more clutches.

In another representation, a driveline system is provided that comprises a driveline component controller configured to adjust operation of a plurality of clutches in a nominal operating mode and a driveline guard controller configured to operate the plurality of clutches in a guarded condition that overrides the nominal operating mode when the plurality of clutches are in an unauthorized configuration that correspond to a driveline speed range for a fault duration threshold.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other powertrain hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the powertrain control system, where the described actions are carried out by executing the instructions in a system including the various powertrain hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to battery electric vehicles, hybrid vehicle, an internal combustion engine vehicle. Further, engines with V-6, I-4, I-6, V-12, opposed 4, and other configurations may be used. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter. The embodiments described above are therefore to be considered in all respects as illustrative, not restrictive.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a vehicle system with an electric machine, comprising:
at a diagnostic controller independent from a driveline controller, respectively, determining an input device state and an electric machine torque;
determining a fault condition of a vehicle component based on the input device state and the electric machine torque; and
in response to determining the fault condition, triggering a fault state of the vehicle component and controlling the vehicle component in a fault mode;
wherein controlling the vehicle component in the fault mode includes operating the diagnostic controller to override a nominal control command sent from the driveline controller to the vehicle component; and
wherein the diagnostic controller and the driveline controller are not in electronic communication with one another.

2. The method of claim 1, wherein the diagnostic controller and the driveline controller are positioned in separate enclosures.

3. The method of claim 1, further comprising determining a gearbox clutch condition prior to determining the fault condition and wherein the fault condition is determined based on the gearbox clutch condition.

4. The method of claim 1, wherein:
the input device state is a power request; and
the method further comprises:
determining a predicted wheel torque based on the electric machine torque; and
determining the fault condition includes determining that the fault condition is occurring when the predicted wheel torque is greater than a threshold value and the power request is less than a threshold value.

5. The method of claim 1, wherein:
the input device state is a gear selector positon; and
the method further comprises:
determining a predicted wheel torque based on the electric machine torque; and
determining the fault condition includes determining that the fault condition is occurring when the predicted wheel torque is greater than a threshold value and is in a direction that is opposite than a direction selected by the gear selector.

6. The method of claim 1, wherein the vehicle component is a gearbox that includes one or more clutches and wherein controlling the gearbox includes opening the one or more clutches.

7. The method of claim 1, wherein the vehicle component is an inverter and wherein controlling the inverter in the fault mode includes decreasing a flow of power from the inverter to the electric machine.

8. The method of claim 1, wherein the step of determining the fault condition is determined while a vehicle speed is less than a threshold value and the method further comprises inhibiting the determination of the fault condition when the vehicle speed is greater than the threshold value.

9. The method of claim 1, wherein the fault state is triggered when the fault condition persists for a duration greater than a threshold value.

10. A vehicle system, comprising:
a diagnostic controller in electronic communication with a mechanical vehicle component and including:
instructions that, when executed, cause the diagnostic controller to:
determine an input device state and an electric machine torque; and
determine the occurrence of a fault condition based on the input device state and the electric machine torque; and
instructions that, when the fault condition is triggered, cause the diagnostic controller to:

control the mechanical vehicle component in a fault state; and override a nominal control command sent from a driveline controller to the mechanical vehicle component;

wherein the diagnostic controller and the driveline controller are not in electronic communication with one another.

11. The vehicle system of claim 10, wherein:

the input device state is a power request from a pedal; and the occurrence of the fault condition is determined when a wheel torque derived from the electric machine torque is greater than a threshold value and the power request is less than a threshold value.

12. The vehicle system of claim 10, wherein:

the input device state is a position of a gear selector;

the occurrence of the fault condition is determined when a wheel speed is in a direction opposite than a direction requested by the gear selector; and the wheel speed is derived from the electric machine torque.

13. The vehicle system of claim 10, wherein the fault condition is triggered when a vehicle speed is less than a threshold value and the fault state exceeds a threshold duration.

14. The vehicle system of claim 10, wherein the mechanical vehicle component is an inverter, an electric machine, or a gearbox that includes one or more clutches.

15. The vehicle system of claim 14, wherein when the mechanical vehicle component is the inverter and wherein controlling the inverter in the fault state includes decreasing a flow of power from the inverter to the electric machine.

16. The vehicle system of claim 14, wherein when the mechanical vehicle component is the gearbox and wherein controlling the gearbox includes opening the one or more clutches.

17. A method for operation of a vehicle system with an electric machine, comprising:

operating a diagnostic processing unit in a diagnostic controller to:

determine an electric machine torque;

derive a wheel torque from the electric machine torque; and responsive to the wheel torque exceeding a threshold value, trigger a fault condition corresponding to one of an inverter, electric machine, or gearbox and overriding a nominal control command sent from a driveline processing unit in a driveline controller to one of the inverter, electric machine, or gearbox;

wherein the diagnostic controller and the driveline controller are not in electronic communication with one another.

18. The method of claim 17, wherein the fault condition is triggered when a vehicle speed is less than a threshold value.

19. The method of claim 17, wherein the fault condition is a condition where wheel direction is opposite of a requested wheel direction.

* * * * *